United States Patent
Donovan et al.

[11] Patent Number: 6,016,609
[45] Date of Patent: Jan. 25, 2000

[54] EZE GLIDE FISH TAPE REEL ASSEMBLY

[76] Inventors: Keith Donovan, 2380 SW. 34 Way, Ft. Lauderdale, Fla. 33322; Daniel L. Walker, 1920 N. 26 Ave., Hollywood, Fla. 33020

[21] Appl. No.: 08/941,229

[22] Filed: Sep. 30, 1997

[51] Int. Cl.⁷ .............................. G01B 3/10; B65H 59/00
[52] U.S. Cl. .................................. 33/756; 33/413; 33/755; 33/758; 33/759; 254/134.3 FT
[58] Field of Search .............................. 33/756, 413, 755, 33/758, 759, 761, 762, 763, 767, 769, 771; 254/134.3 FT; 242/397, 397.1, 397.2, 396.1, 396.5

[56] References Cited

U.S. PATENT DOCUMENTS

| | | |
|---|---|---|
| 1,751,415 | 3/1930 | McCaffrey . |
| 2,509,100 | 5/1950 | Jordan . |
| 2,928,656 | 3/1960 | Lindsey . |
| 2,980,398 | 4/1961 | Raney et al. . |
| 3,494,038 | 2/1970 | Quenot ..................................... 33/769 |
| 3,533,599 | 10/1970 | Hindenburg .................... 254/134.3 FT |
| 3,582,044 | 6/1971 | Gardner .......................... 254/134.3 FT |
| 4,092,780 | 6/1978 | Tretheway et al. ...................... 33/762 |
| 4,573,829 | 3/1986 | Keene et al. ................... 254/134.3 FT |
| 4,578,867 | 4/1986 | Czerwinski et al. ...................... 33/761 |
| 4,692,957 | 9/1987 | Kovacs ............................ 254/134.3 FT |
| 5,423,516 | 6/1995 | Blaha .............................. 254/134.3 FT |
| 5,440,820 | 8/1995 | Hwang ..................................... 33/761 |

*Primary Examiner*—Christopher W. Fulton
*Attorney, Agent, or Firm*—Liniak, Berenato, Longacre & White

[57] ABSTRACT

A fish tape reel and reversible lead device which includes a pistol-grip configuration which is ergonomically designed for ease, safety and convenience in pushing or pulling fish tape through conduit by utilizing only one hand. The reel comprises a counter device and spring steel cable storage mechanism so that the length of tape played out will be measured and efficiently rewound onto the receiving spool disposed within the reel.

6 Claims, 2 Drawing Sheets

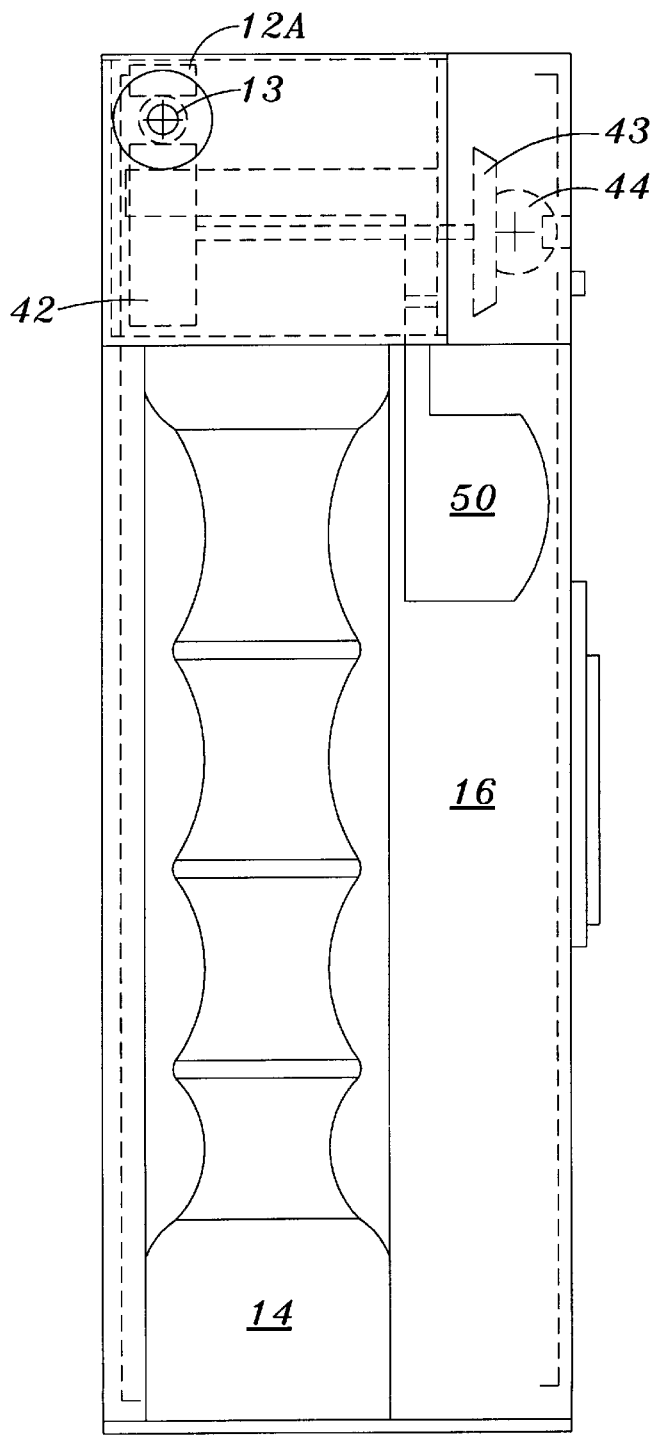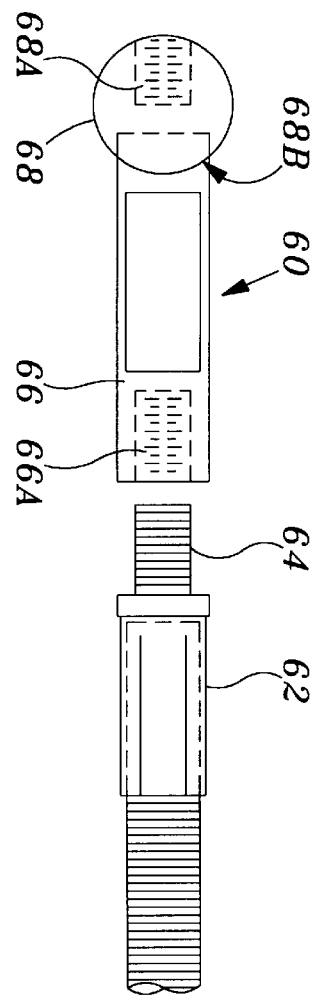

EZE GLIDE FISH TAPE REEL ASSEMBLY

BACKGROUND OF THE INVENTION a) Field of the Invention

This invention relates to an electrician's fish tape reel assembly which is ergonomically designed for ease, safety and convenience in pushing or pulling fish tape through conduit by utilizing only one hand. The fish reel tape comprises means for measuring and displaying the length of tape feed, a thumb brake for locking the fish tape, and means for storing the tape efficiently on the tape spool.

b) Description of Related Art

In the course of disposing electrical wiring through a is conduit it is customary for the electrician to pass a so-called fish tape back through the conduit to the opposite end of the conduit where the lead end of the electrical wiring is presented. The lead end of the wire is fastened to the lead end of the tape and the tape is retracted to pull the wire forward. The tape may also be used to obtain an approximation of the location of an obstruction in the conduit.

There was a time when the cost of wasted wire could be disregarded. The electrician was not particularly concerned about wasting several feet when overestimating the length of wire required. In the present market the cost factor of wasted wire is of significance; therefore, an accurate counter has become an increasingly significant feature in an electrician's fish tape.

Various mechanisms and reels have been used to house a fish tape, with assorted arrangements for paying the tape out of the case during use. Prior art reels typically use the inside surface of an outer peripheral wall of the reel to constrain the coil. This wall is circumferentially split to define a slot extending around the reel to allow the tape to be extracted from the reel. The halves of the wall normally meet to enclose the coiled tape but they are flexed or spread apart by a winder at the point where the tape exists. The winder can be pushed or pulled around the circumference of the reel to pay out the outer end of the tape. Thus, in essence, the exit opening in the reel moves around the periphery of the reel. U.S. Pat. No. 3,424,435 shows an example of this type of reel.

U.S. Pat. No. 5,324,516 discloses a fish tape reel in which the tape is wound on the outside diameter of a hub. The hub is rotatably mounted inside of an annular outer race. A stationary handle is fixed on the outside of the race. A knob is pivotally attached to the hub. A user can hold the handle with one hand and the knob with the other to rotate the hub and cause the tape to move into the reel. This design, however, suffers from many drawbacks such as the necessity for two-handed use by the operator and the inefficient distribution and recall of the fish tape.

Despite the attempts of the prior art, there exists a need in the prior art for a fish tape reel which is ergonomically designed for ease, safety and convenience in pushing or pulling fish tape through conduit by utilizing only one hand.

The need also exists for effective fish tape leader design which facilitates ease and convenience of feeding the tape through a conduit and retrieval of the tape back into the fish tape reel.

SUMMARY OF THE INVENTION

An object of this invention is to provide a fish tape reel employing a pistol grip handle design for ease, safety and convenience in pushing or pulling the tape through the conduit by utilizing only one hand.

The present invention also provides a mechanism for automatically storing the cable properly on the reel when rewinding by the use of spring steel cable storage guides.

A thumb brake is provided for selectively locking the cable at any point through a simple yet effective braking mechanism.

The present invention also provides a counter which measures the exact length of any conduit run through the use of a friction wheel which engages the fish tape.

The use of a round leader facilitates a smoother passage of the fish tape through any type conduit. Moreover, a reversible leader is provided by this invention. The reversibility of the leader enhances the convenience of retrieving or pulling wire through any type conduit.

These and other advantages of the present invention will become apparent to those possessing skill in the art with reference to the following drawings and associated description.

BRIEF DESCRIPTION OF THE DRAWINGS

FIG. 2 is a front view on the line 2—2 of FIG. 1; and

FIG. 3 is a plan view of the reversible fish tape leader assembly.

DESCRIPTION OF THE PREFERRED EMBODIMENTS

Figure 1:
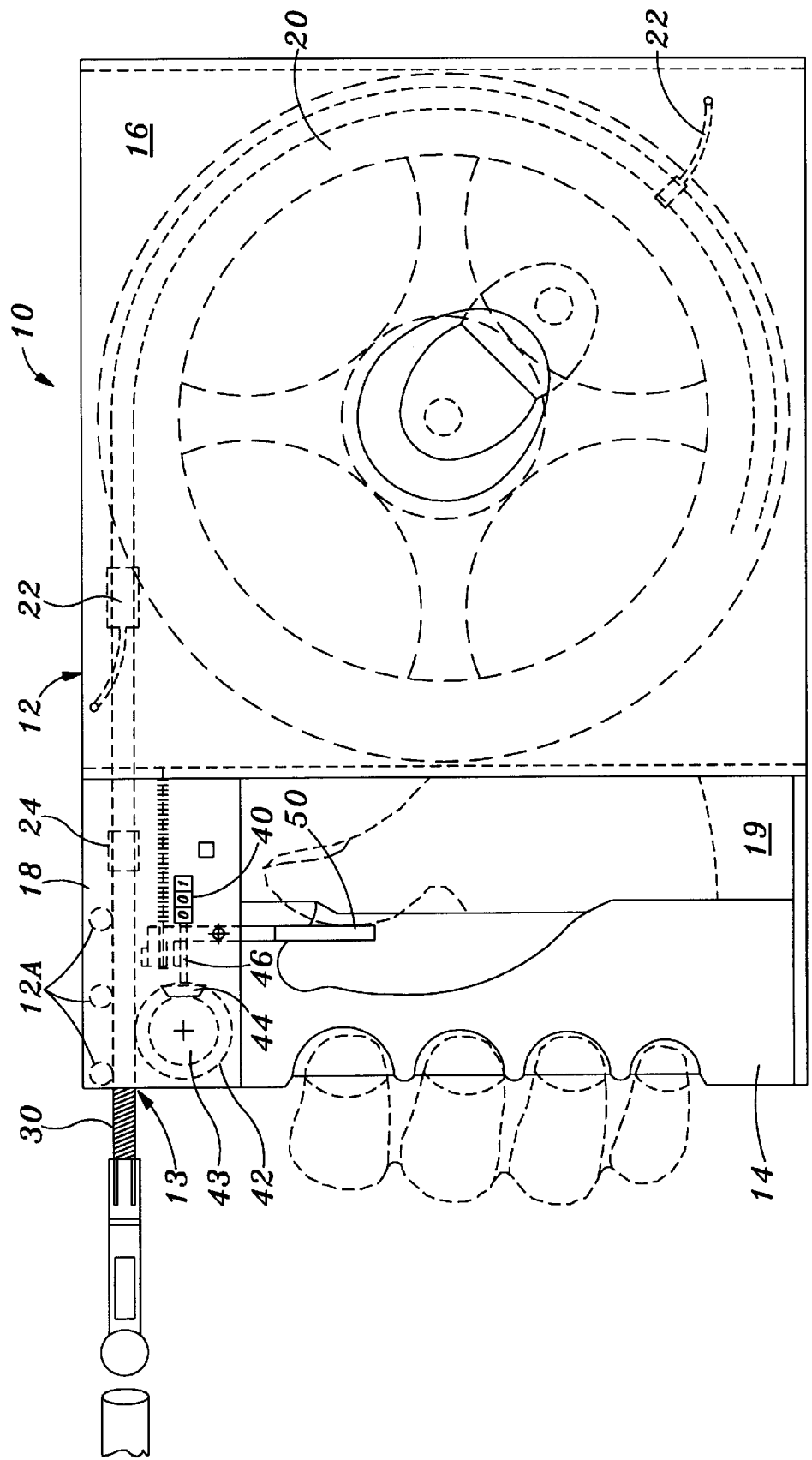
FIG. 1 is a plan view of the fish tape reel assembly of the present invention, partly broken away, to reveal certain features.

A fish tape reel assembly is indicated generally by reference numeral 10 and includes a housing 12, a fish tape hub 20, and a fish tape 30. The housing 12 may be made of metal or a strong plastic, such as high density polyethylene or the like. Of course, other suitable materials may be utilized. As seen in FIGS. 1 and 2, a forward reel section 14 is generally rectangular in shape and defines a pistol-grip shape. This pistol-grip-shaped section 14 ergonomically accommodates one hand of a user as shown by dotted lines in FIG. 1.

A fish tape spool or hub 20 is rotatably disposed within the main hub section 16 of the housing 10. The fish tape 30 is wound around the fish tape hub 20 when retracted into the main hub section 16 of the housing 10. Spring means in the form of spring steel cable storage guides 22 are disposed within the main hub section 16 for biasing the fish tape toward the hub 20 to thereby properly store the cable or tape on the hub 20 during the rewinding process. It will be understood that other suitable spring means 22 could be used so long as they are effective to overcome the natural tendency of the tape to remain straight by uncoiling. It is the job of the spring means 22, in whatever form, to prevent uncoiling and to force the tape to remain coiled on the outside diameter of the hub's core. In the preferred embodiment, the top storage guide biases the tape to one side of the hub 20 while the lower storage guide biases the tape downward toward the hub 20.

The main hub section 16 is connected to the pistol-grip section 14 by a central section 18 to thereby form a substantially U-shaped housing 12. A passageway or spacing 19 is provided between the main hub section 16 and the pistol-grip section 14 to receive the hand or palm of the operator who is grasping the pistol-grip section 14.

A counter mechanism 40 is provided on the reel 10 to measure the amount of fish tape that is fed out of the fish tape reel 10. Tape feed is tracked by a drive wheel 42 shown in FIGS. 1 and 2. The wheel 42 frictionally engages the fish tape 30 and rotates with movement of the fish tape 30. Preferably, the wheel 42 is composed of high friction material to reduce slippage between the fish tape 30 and the wheel 42. The friction wheel 42 drives a shaft 42a to which is mounted a face gear 43 which matingly engages the gear 44 mounted on shaft 46. The shaft 46 drives the counter which is calibrated to display the length of fish tape that has been fed from the reel 10.

The specific gearing arrangement will be apparent to those of skill in the art and should not be limited in any manner to the specific arrangement of FIGS. 1 and 2. For example, the drive wheel 42 may rotate an index disc which, in turn, steps a set of counting gears. A reducing gear train may be interposed between the drive wheel and the index disc to provide proper calibration. The meter or counter is similar to those manufactured by Keson Industries of Napersville, Ill. or Rolatape Manufacturers of Spokane, Wash.

As seen in FIG. 1, the housing 12 is provided with top-side tape engaging members or idler wheels 12a which engage and partially guide the fish tape 30 between the exit aperture 13 and the fish tape hub 20. The friction wheel 42 is disposed opposite the top-side tape engaging members 12a with respect to the fish tape 30.

Therefore, the fish tape 30 extends from the hub 20 past the cable storage guides 22 through guide sleeve 24; the fish tape 30 exits the fish tape reel 10 at the exit aperture 13. Between the guide sleeve 24 and the exit aperture 13, the fish tape 30 is stabilized by the top-side engaging members 12a and the friction wheel 42.

The fish tape reel 10 of the invention is further provided with a thumb brake or locking lever 50 pivotally mounted on the forward (pistol grip) reel section 14 adjacent the friction wheel 42. The thumb brake 50 may be pivoted by the user to lock the position of the fish tape with respect to the tape reel 10 as a result of the frictional resistance created on the fish tape 30 between the engaging members 12a and the thumb brake 50.

An important aspect of this invention is the reversible fish tape leader 60 shown in FIG. 3. With reference to FIG. 3, a flexible fish tape 30 is provided with a ferrule 62 having a collar end that is crimped onto the end of the tape 30. A threaded male end 64 projects from the ferrule along the axis of the flexible fish tape 30. The reversible fish tape leader 60 is comprised of a slotted stainless steel rod 66 and a ball bearing 68. The rod 66 has a threaded female end 66a which threadingly engages the male end 64. The ball bearing 68 is formed with a threaded female recess 68a and a second recess 68b opposite the threaded female recess 68a. The stainless steel rod 66 is pressfit into the second recess 68b provided in the ball bearing 68.

The reversibility of the leader 60 derives from the two oppositely positioned threaded female ends 66a and 68a. When the fish tape 30 is fed into a conduit, the male end 64 is engaged with the threaded female end 66a of the leader 60 such that the ball bearing 68 defines the leading edge of the leader 60. However, when the fish tape 30 is retracted from the conduit, the male end 64 is engaged with the threaded female end 68a to once again define the leading edge of the leader 60 as the fish tape 30 is retrieved from the conduit.

The use and operation of the fish tape reel constructed in accordance with the present invention in feeding the snake into the conduit and pulling the snake from a conduit will now be described. First, the fish tape 30 is secured to the leader 60 via the threaded male end 64 and the threaded female end 66a. With one hand, the operator then grasps the fish tape reel 10 at the forward (pistol grip) reel section 14. The operator's other hand feeds the fish tape from the reel 10 into a conduit (not shown), or retrieves the fish tape from the conduit. If necessary or desired, the operator may lock the fish tape 30 in place by actuating the thumb brake 50. The thumb brake 50 frictionally locks the fish tape 30 with respect to the housing 12. The amount or length of fish tape 30 fed from the reel 10 is displayed by the counter on the reel 10.

While the foregoing invention has been shown and described with respect to a preferred embodiment, it will be understood by those of skill in the art that various changes in form and detail may be made therein without departing from the spirit and scope of the claimed invention.

We claim:

1. A combination fish tape and fish tape reel assembly, comprising:

a housing comprising a main hub section, a central section and a gripping section, said central section is fixed with respect to said main hub section and said gripping section;

a receiving hub contained and rotatably supported inside said main hub section of said housing;

a fish tape spooled onto said receiving hub and adapted to be fed out from said reel and into a conduit, said fish tape extending from said receiving hub to an exit aperture provided in said housing;

a brake means for locking a position of said fish tape with respect to said housing, said brake means engaging said fish tape between said receiving hub and said exit aperture, wherein said gripping section is generally rectangular in shape and is spaced apart from said main hub section by a distance sufficient to permit an operator's hand to grip said gripping section, and wherein said central section is provided with a plurality of tape engaging members and a guide sleeve for guiding said fish tape between said main hub section and said exit aperture.

2. A combination fish tape and fish tape reel assembly, comprising:

a housing comprising a main hub section, a central section and a gripping section, said central section is fixed with respect to said main hub section and said gripping section;

said gripping section is generally rectangular in shape and is spaced apart from said main hub section by a distance sufficient to permit an operator's hand to grip said gripping section;

a receiving hub contained and rotatably supported inside said main hub section of said housing;

a fish tape spooled onto said receiving hub and adapted to be fed out from said reel and into a conduit, said fish tape extending from said receiving hub to an exit aperture provided in said housing;

a brake means for locking a position of said fish tape with respect to said housing, said brake means engaging said fish tape between said receiving hub and said exit aperture, wherein said main hub section and said gripping section are connected by said central section of said housing; said central section extends substantially orthogonally from said main hub section, and said gripping section extends substantially orthogonally from said central section and substantially parallel to said main hub section to thereby form the housing in a substantially U-shaped configuration.

3. The combination according to claim 1, wherein said exit aperture is located on said central portion opposite said main hub section.

4. The combination according to claim 1, further comprising a spring means provided with a guide channel for properly guiding and storing said fish tape onto said receiving hub, said spring means preventing uncoiling of said fish tape from said receiving hub.

5. The combination according to claim 1, further comprising a counter mechanism for determining a length of said fish tape distributed from said receiving hub.

6. A combination fish tape and fish tape reel assembly, comprising:

a housing comprising a main hub section, a central section and a gripping section;

a receiving hub rotatably supported within said main hub section of said housing;

a fish tape spooled onto said receiving hub and adapted to be fed out from said reel and into a conduit, said fish tape extending from said receiving hub to an exit aperture provided in said housing;

a brake means for locking a position of said fish tape with respect to said housing, said brake means engaging said fish tape between said receiving hub and said exit aperture, and a reversible fish tape leader selectively connected to an end of said fish tape, wherein said leader comprises an elongated rod and a ball bearing affixed to one end of said rod, said leader comprising connection means for selectively connecting said leader to said fish tape through one of said elongated rod and said ball bearing thereby providing a reversibility features for said leader.

* * * * *